(12) United States Patent
Fuller

(10) Patent No.: US 10,969,096 B2
(45) Date of Patent: Apr. 6, 2021

(54) MODULAR MAT SYSTEM WITH SOLAR POWERED ILLUMINATION

(71) Applicant: Mark W. Fuller, Houston, TX (US)

(72) Inventor: Mark W. Fuller, Houston, TX (US)

( * ) Notice: Subject to any disclaimer, the term of this patent is extended or adjusted under 35 U.S.C. 154(b) by 0 days.

(21) Appl. No.: 16/886,660

(22) Filed: May 28, 2020

(65) Prior Publication Data

US 2020/0378593 A1 Dec. 3, 2020

Related U.S. Application Data

(60) Provisional application No. 62/853,464, filed on May 28, 2019.

(51) Int. Cl.
| | | |
|---|---|---|
| *F21V 33/00* | (2006.01) | |
| *F21S 9/03* | (2006.01) | |
| *F21V 17/14* | (2006.01) | |
| *E01C 17/00* | (2006.01) | |
| *F21V 17/06* | (2006.01) | |
| *F21Y 115/10* | (2016.01) | |

(52) U.S. Cl.
CPC ............ *F21V 33/006* (2013.01); *E01C 17/00* (2013.01); *F21S 9/035* (2013.01); *F21V 17/14* (2013.01); *F21V 17/06* (2013.01); *F21Y 2115/10* (2016.08)

(58) Field of Classification Search
None
See application file for complete search history.

(56) References Cited

U.S. PATENT DOCUMENTS

| | | | | |
|---|---|---|---|---|
| 3,909,996 A | * | 10/1975 | Ettlinger, Jr. | ......... E04F 15/105 52/177 |
| 4,287,693 A | * | 9/1981 | Collette | ............ A47G 27/0212 52/177 |
| 5,052,158 A | * | 10/1991 | D'Luzansky | ......... F16B 17/008 52/177 |
| 5,390,090 A | * | 2/1995 | Nau | ........................ F21S 8/022 362/145 |
| 5,950,378 A | * | 9/1999 | Council | ................ E01C 13/045 52/177 |
| 6,027,280 A | * | 2/2000 | Conners | ................... E01C 17/00 362/153.1 |
| 6,526,705 B1 | * | 3/2003 | MacDonald | ............ E04F 15/02 428/157 |
| 6,715,956 B1 | * | 4/2004 | Weber | ....................... E01C 5/20 404/18 |
| 7,021,786 B1 | * | 4/2006 | Sandor, Sr. | ............. E04F 15/08 362/153 |
| 7,930,865 B2 | * | 4/2011 | Barlow | ................. E04F 15/105 52/741.11 |
| 9,863,590 B2 | | 1/2018 | Olsson et al. | |
| 10,448,580 B1 | | 10/2019 | Borras | |
| 10,557,600 B1 | | 2/2020 | South | |
| 10,619,805 B2 | | 4/2020 | Olsson et al. | |
| 2006/0291197 A1 | * | 12/2006 | Patti | ........................ F21V 21/04 362/153.1 |
| 2009/0116241 A1 | * | 5/2009 | Ashoff | ................. G02B 6/0078 362/253 |

(Continued)

*Primary Examiner* — Elmito Breval
(74) *Attorney, Agent, or Firm* — Patterson & Sheridan, L.L.P.

(57) ABSTRACT

A modular mat assembly formed from recycled material and anchored to the ground to form a sidewalk having replaceable sections and enclosed LED lighting for night time illumination.

9 Claims, 10 Drawing Sheets

(56) References Cited

U.S. PATENT DOCUMENTS

| | | | |
|---|---|---|---|
| 2009/0162593 A1* | 6/2009 | Kotulla | B44C 3/123 428/39 |
| 2010/0188842 A1* | 7/2010 | Yohananoff | G09F 13/18 362/153.1 |
| 2011/0062888 A1* | 3/2011 | Bondy | H05B 45/37 315/294 |
| 2012/0163909 A1* | 6/2012 | Liu | E01C 5/001 404/34 |
| 2014/0161525 A1 | 6/2014 | Smith | |
| 2018/0242530 A1* | 8/2018 | Van Giel | B32B 5/022 |

\* cited by examiner

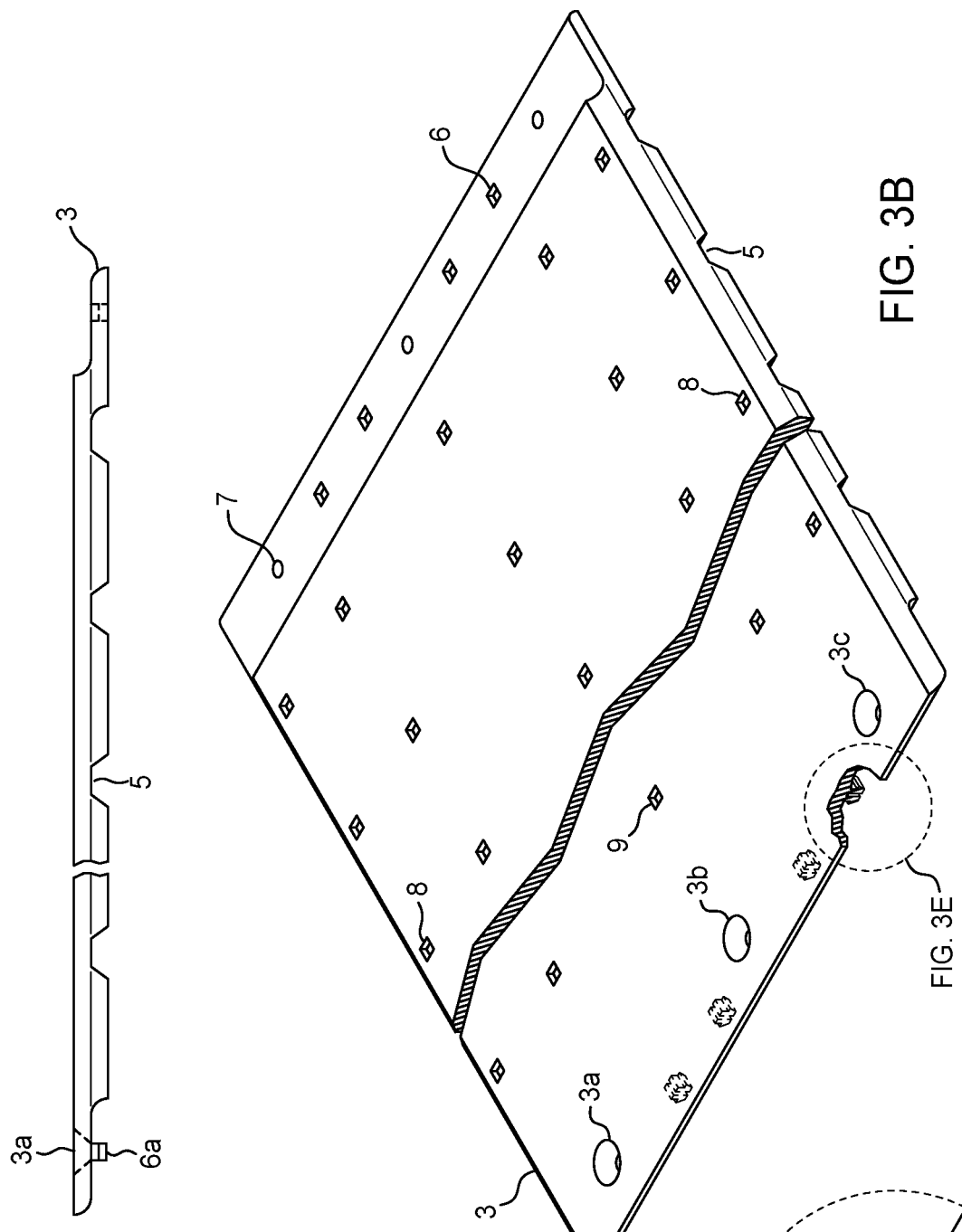

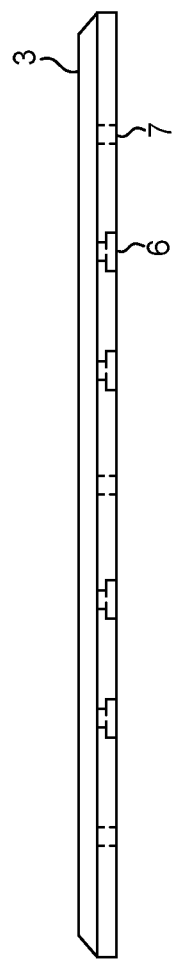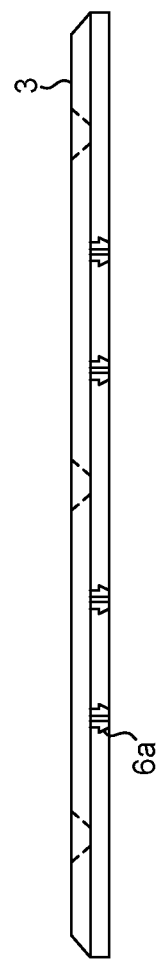

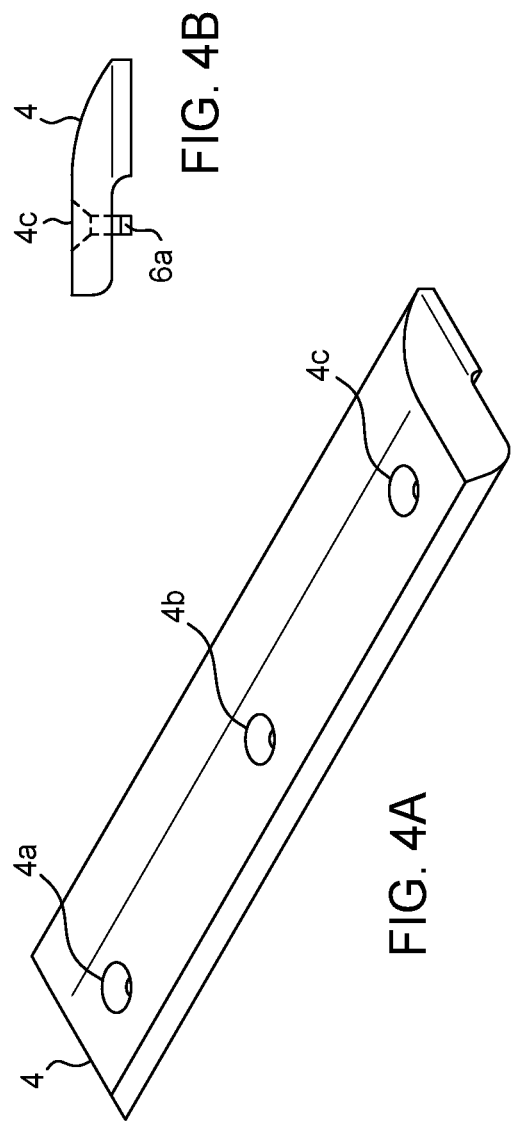
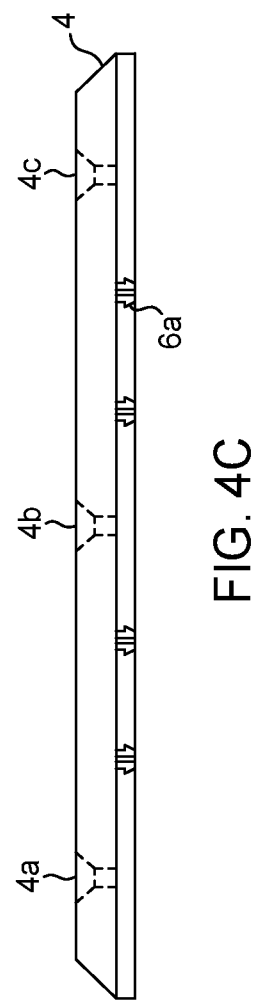

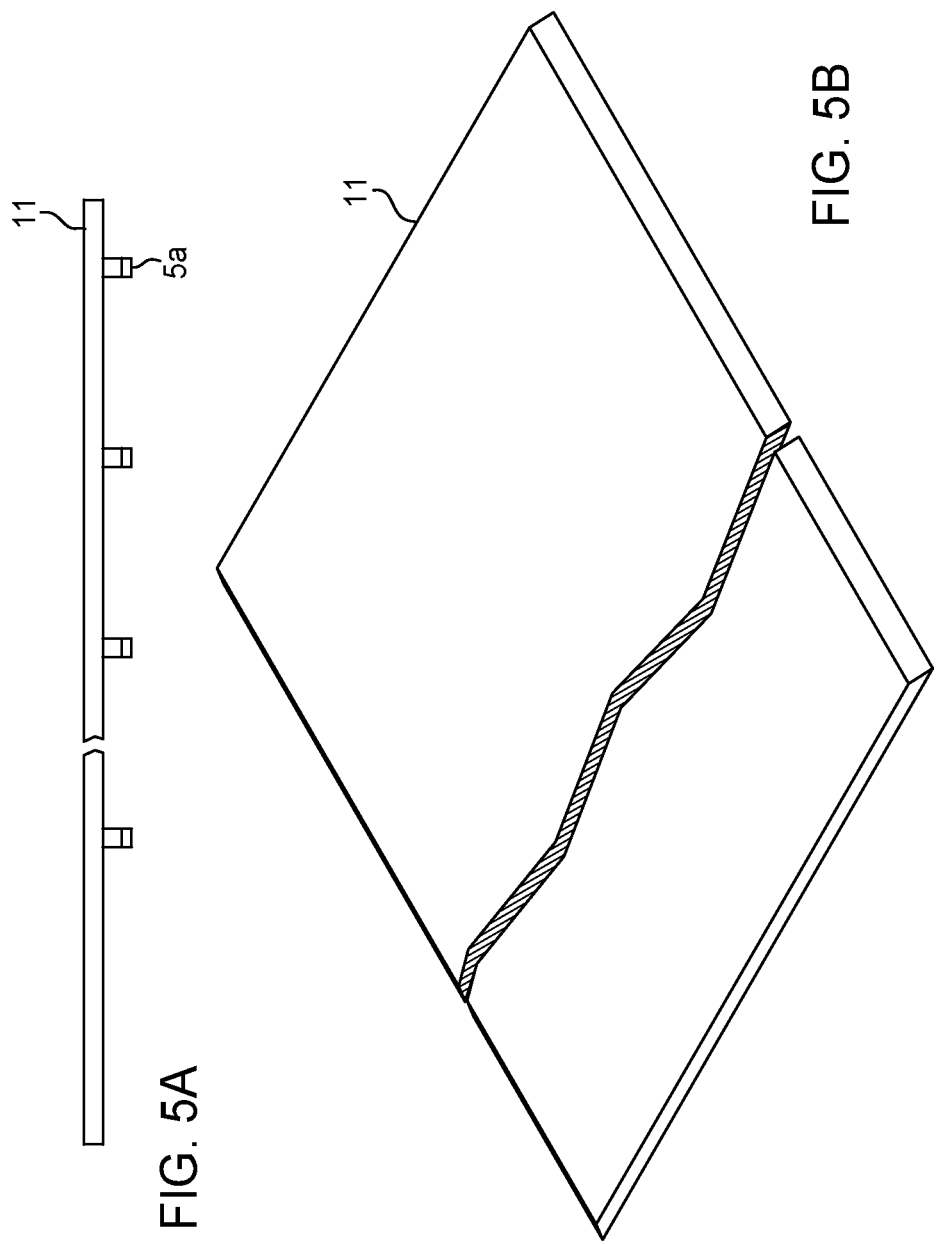

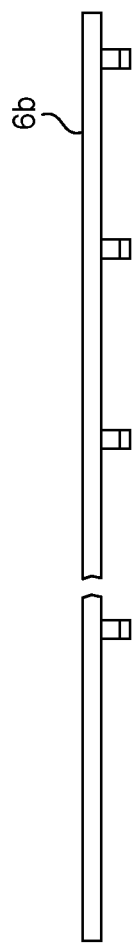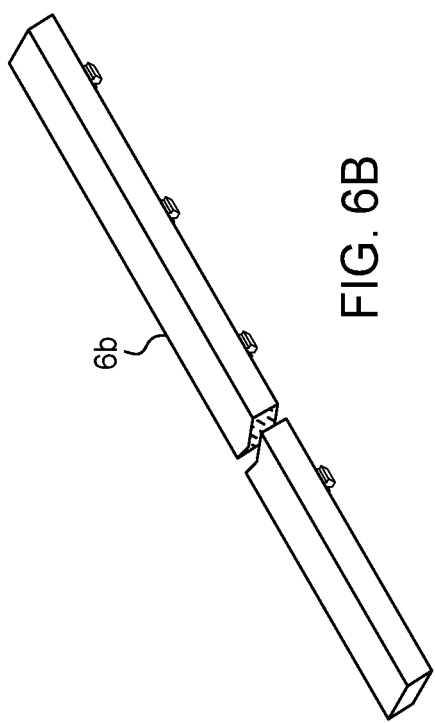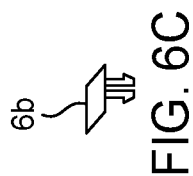

MODULAR MAT SYSTEM WITH SOLAR POWERED ILLUMINATION

CROSS-REFERENCE TO RELATED APPLICATION

This application claims benefit of U.S. provisional patent application Ser. No. 62/853,464, filed May 28, 2019, which is herein incorporated by reference.

FIELD OF THE INVENTION

The present invention relates to a modular walkway that may include solar powered illumination.

BACKGROUND

One advantage of living in many inner-city areas is the prevalence of sidewalks. Conversely, if you find yourself living in the suburbs, there's a good chance that traveling even a relatively short distance to shopping, dining, laundry, postal or other service destinations safely will require a car. While housing subdivisions and master-planned communities often have sidewalks for their residents to travel safely to pools and parks within them, areas between these developments frequently have no pedestrian pathways interconnecting them. Providing conventional concrete sidewalks requires a significant investment of city revenue not only to build them, but also to provide lighting to minimize the potential for tripping on debris at night. With the amount of recyclable plastic destined for landfills or to be recovered from the world's oceans, there exists an abundant source of material for making relatively inexpensive and durable pathways for walking, biking, skating, wheelchairs, etc.

SUMMARY

The present invention seeks to minimize the cost to provide walkways, such as an illuminated walkway, that is produced using discarded material to help people get around their neighborhoods. A modular mat assembly made preferably of recyclable plastic that, when laid on the ground, is interconnected to other mats and is fastened to the soil, provides an even, unobstructed walkway for traversing a locality in lieu of driving a vehicle. The assembly can include solar technology to supply power to light emitting diodes (LEDs) for reliable illumination at night.

DESCRIPTION OF THE DRAWINGS

FIG. 3A shows a side view of a Bottom/Foundation Mat, FIG. 3B is a perspective view of the Bottom/Foundation Mat, FIG. 3C is a front end view of the Bottom/Foundation Mat, FIG. 3D is a rear end view of the Bottom/Foundation Mat, and FIG. 3E shows an enlarged section view of a feature on FIG. 3B.

FIG. 4A shows a perspective view of a Terminating Anchoring Element, FIG. 4B is a side view of the Terminating Anchoring Element, and FIG. 4C is a rear end view of the Terminating Anchoring Element.

FIG. 5A shows a side view of a Top/Surface Contact Mat, FIG. 5B is a perspective view of the Top/Surface Contact Mat, and FIG. 5C is an end view of the Top/Surface Contact Mat.

FIG. 6A shows a side view of a reversible shoulder element light fixture, FIG. 6B is a perspective view of the reversible shoulder element light fixture, and FIG. 6C is an end view of the reversible shoulder element light fixture.

DESCRIPTION OF THE PREFERRED EMBODIMENT

Figure 1:
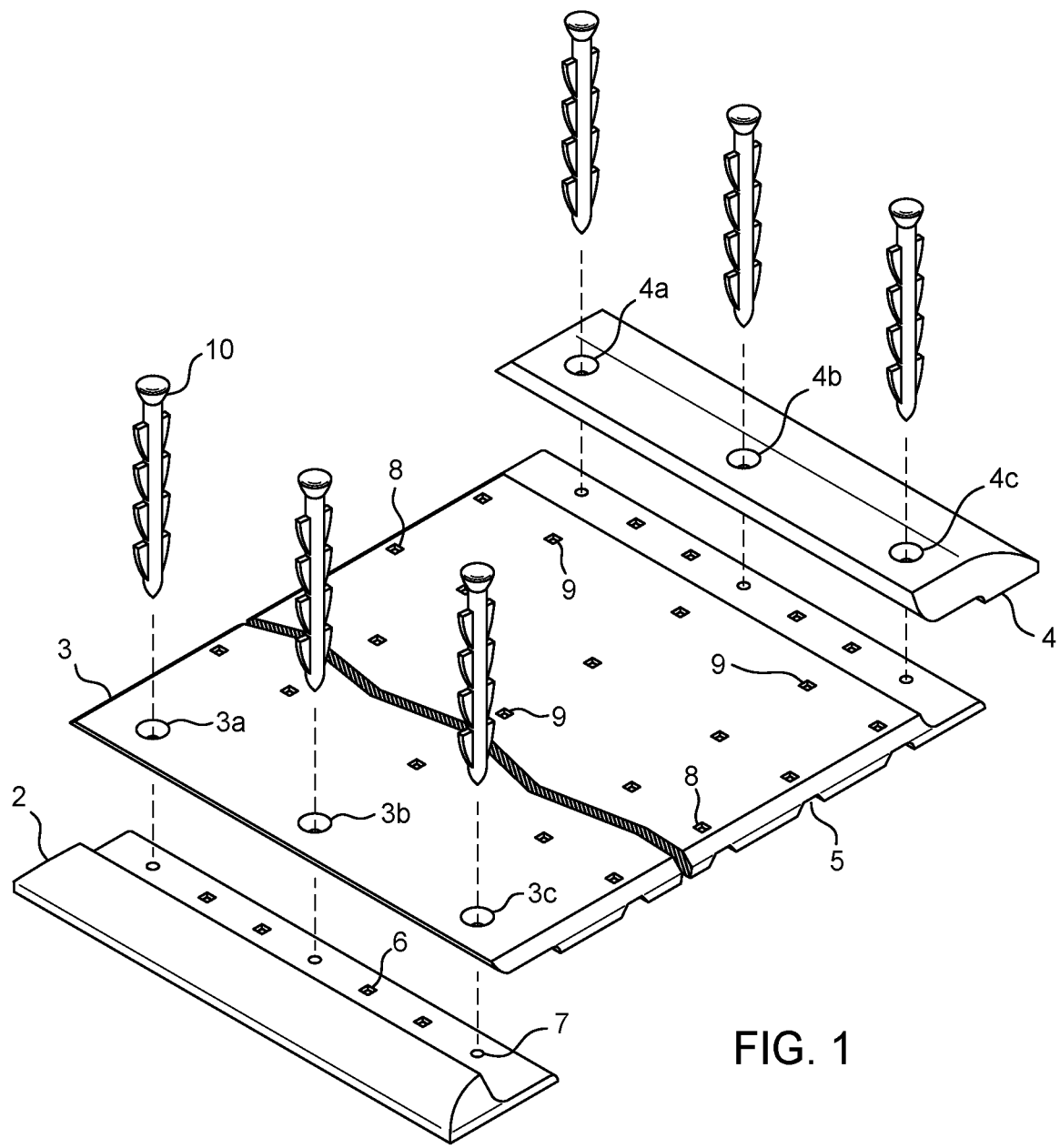
FIG. 1 shows an exploded view of the elements of a preferred embodiment showing the foundation of the invention.

FIG. 1 shows an exploded view of the foundation components of the invention. To install the assembly, the ground will likely need to be prepared. This may require a construction machine such as a motor grader, an earth scraper, or small bulldozer. The objective is to create a level surface from side to side relative to the direction of the pathway. The intermediate member of the invention, such as Bottom/Foundation Mat 3 has multiple grooves 5 to allow for longitudinal flexion to conform to an undulating surface. Once the ground is leveled laterally, installation of the assembly can begin. A Commencing Anchoring Element 2 is placed on the ground with the smooth, tapered end facing opposite the direction of the intended path. The Bottom/Foundation Mat 3 is then positioned on the ground with the end containing the countersunk holes 3a, 3b, 3c facing upward and aligned overlapping the lower end of the Commencing Anchoring Element 2.

Figure 2A:
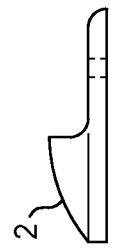
FIG. 2A shows a side view of a Commencing Anchoring Element.
Figure 2B:
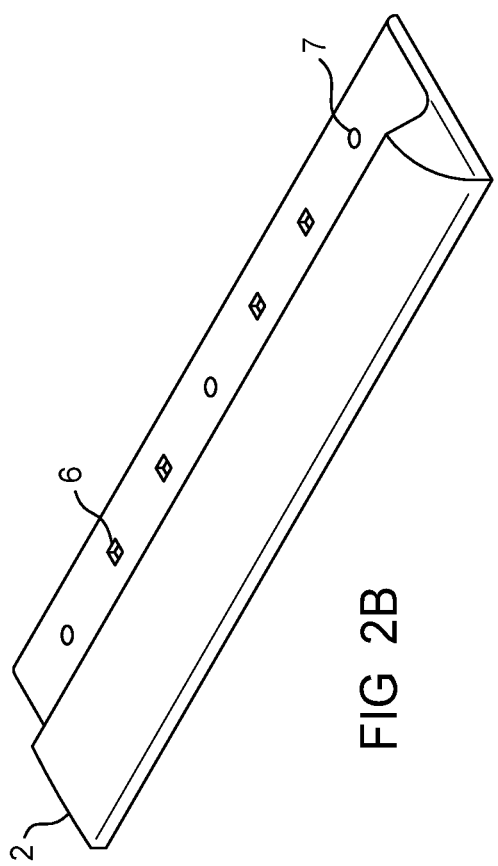
FIG. 2B is a perspective view of the Commencing Anchoring Element.
Figure 2C:
FIG. 2C is a rear end view of the Commencing Anchoring Element.
Figure 2D:
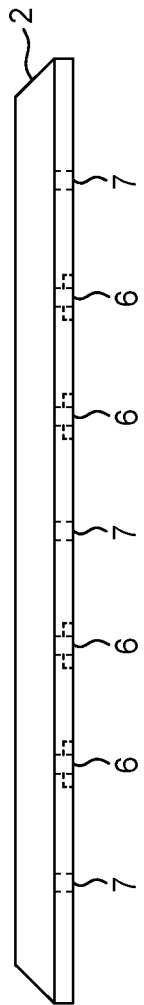
FIG. 2D is a front end view of the Commencing Anchoring Element.

Fastening the Bottom Foundation Mat 3 to the Commencing Anchoring Element 2 occurs by applying downward force on the overlapping end to snap the retainers 6a on the underside of the mat (FIG. 3D) into the receptacles 6 in the commencing anchoring element 2 (FIG. 2B). This can be done by stepping down on the mat using your foot. Still referring to FIG. 1 to anchor these components to the ground, a push-in, one-way ground retainer 10 is driven through a countersunk hole 3a, 3b, or 3c in the mat. An opening will first need to be drilled/made in the ground to serve as a pilot hole for the ground retainer. The ground retainer is preferably also made of recycled plastic. Next, place a second mat on the ground in the same manner with the end with countersunk holes overlapping the opposite, lower end of the mat just fastened to the ground. Step down on the overlapping end of the second mat to snap its retainers 6a into the receptacles 6 in the first mat (FIG. 3B). Repeat this process with each subsequent mat for a desired length of the sidewalk.

FIG. 4A shows a perspective of a Terminating Anchoring Element 4 which is similar to the Commencing Anchoring Element in that it's tapered and serves to define an end of the sidewalk. One difference is the addition of retainers 6a on the underside of its overlapping portion (see FIG. 4C). Then position the Terminating Anchoring Element with countersunk holes 4a, 4b, 4c upward and aligned over the end of the last Bottom/Foundation Mat of the sidewalk and snap the anchoring element's retainers 6a into the receptacles in the final mat. To complete the installation of the foundation components of the walkway, ground retainers 10 (FIG. 1) are driven through every provision in the mats 3a, 3b, 3c and Terminating Anchoring Element 4a, 4b, 4c to fasten them to the ground. This is done in the same manner as described above for driving a ground retainer through the first foundation mat connected to the Commencing Anchoring Element which locates the beginning of the walkway. To this point, the aforementioned description explains the installation and use of the essential elements of the invention. Once installed, the Commencing Anchoring Element, Bottom Foundation mats and Terminating Anchoring Element remain securely attached to the ground.

To complete the installation of the sidewalk mat assembly, a removable Top/Surface Contact Mat 11 (FIGS. 5A, 5B, 5C) is snapped onto each Bottom/Foundation mat in the same manner as the foundation assembly elements fasten to each other. This conceals the bottom mat's anchoring fasteners 10 (see FIG. 1) to protect them against tampering and provides an even, featureless surface for pedestrians to walk on. This removable top layer also makes the sidewalk more serviceable or maintenance friendly. Should sections of the walkway's surface become worn, vandalized, or otherwise damaged, the removable Top/Surface Contact Mats 11 affected can be replaced without dismantling the foundation assembly which would require extracting or otherwise disabling the fasteners anchoring it to the ground. Solar cells and light emitting diodes (LEDs) are integrated into the Top/Surface Contact Mat to provide self-contained illumination of the sidewalk at night.

Figure 7:
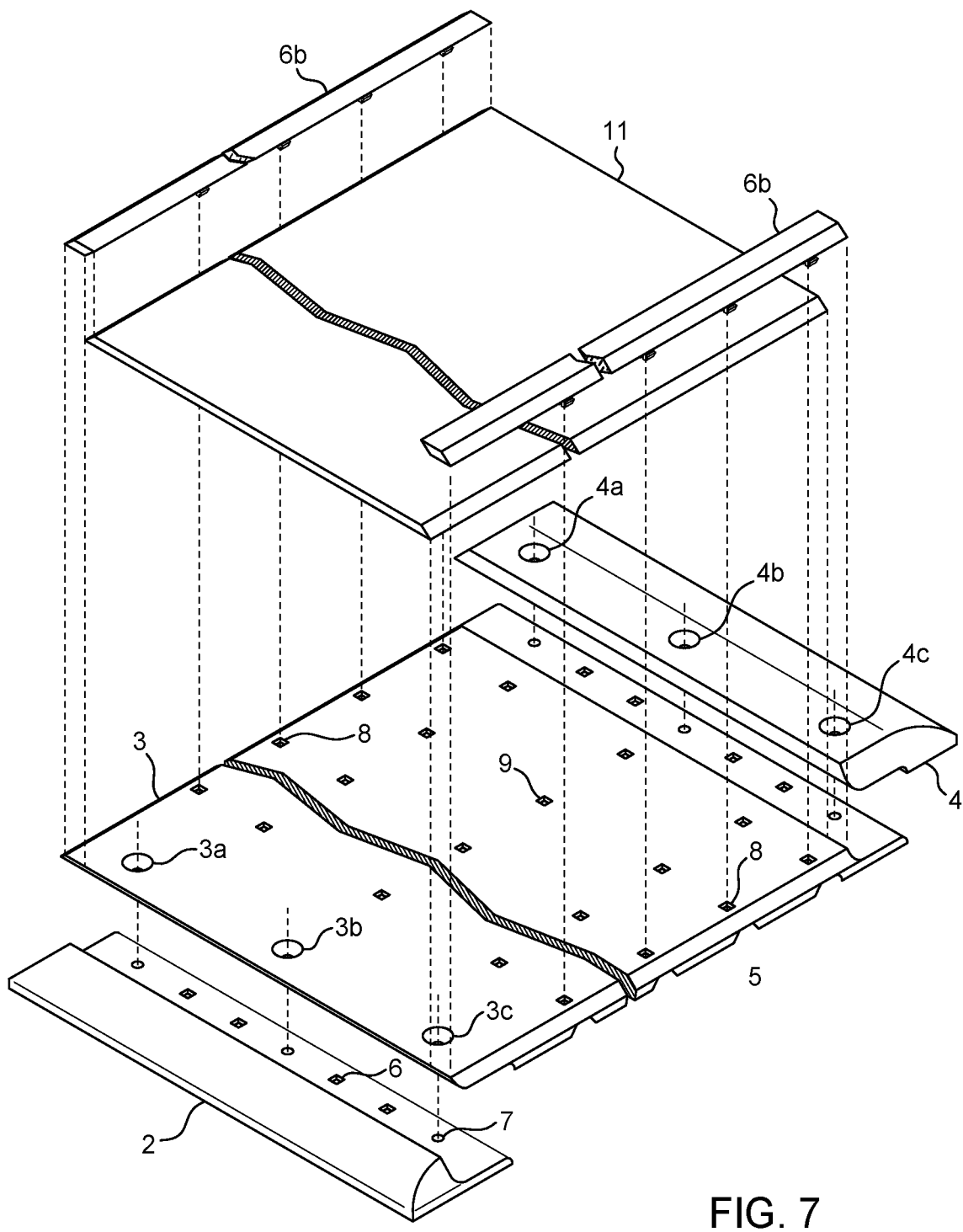
FIG. 7 shows an exploded view of the modular mat system.

To further enhance the serviceability of the assembly, FIG. 7 shows an exploded view of the invention with a Top/Surface Contact Mat 11 and separate reversible shoulder elements 6b that contain the technology for self-contained solar powered LEDs. In this manner, cost to maintain the sidewalk is reduced by replacing only the faulty part of each mat section as the need for repairs arise. As an added note, it should be appreciated that the modular mat system includes mat sections molded/configured to accommodate the need for direction changes and intersecting paths wherever required in the landscape.

Figure 8:
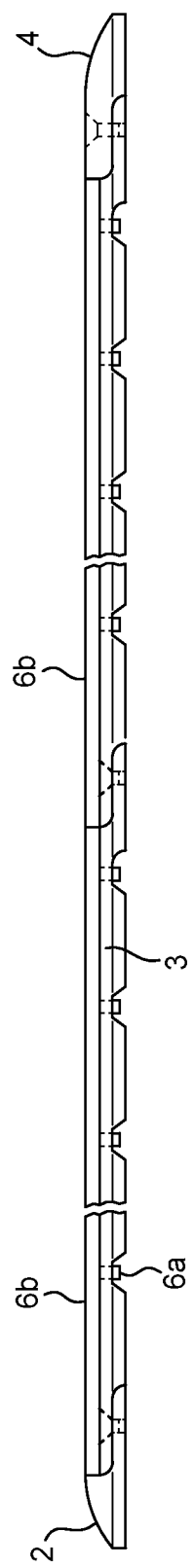
FIG. 8 shows a side view of the assembly.

A side view of the assembled components of the sidewalk is shown in FIG. 8 with a break line indicating extended length of the sidewalk.

Figure 9:
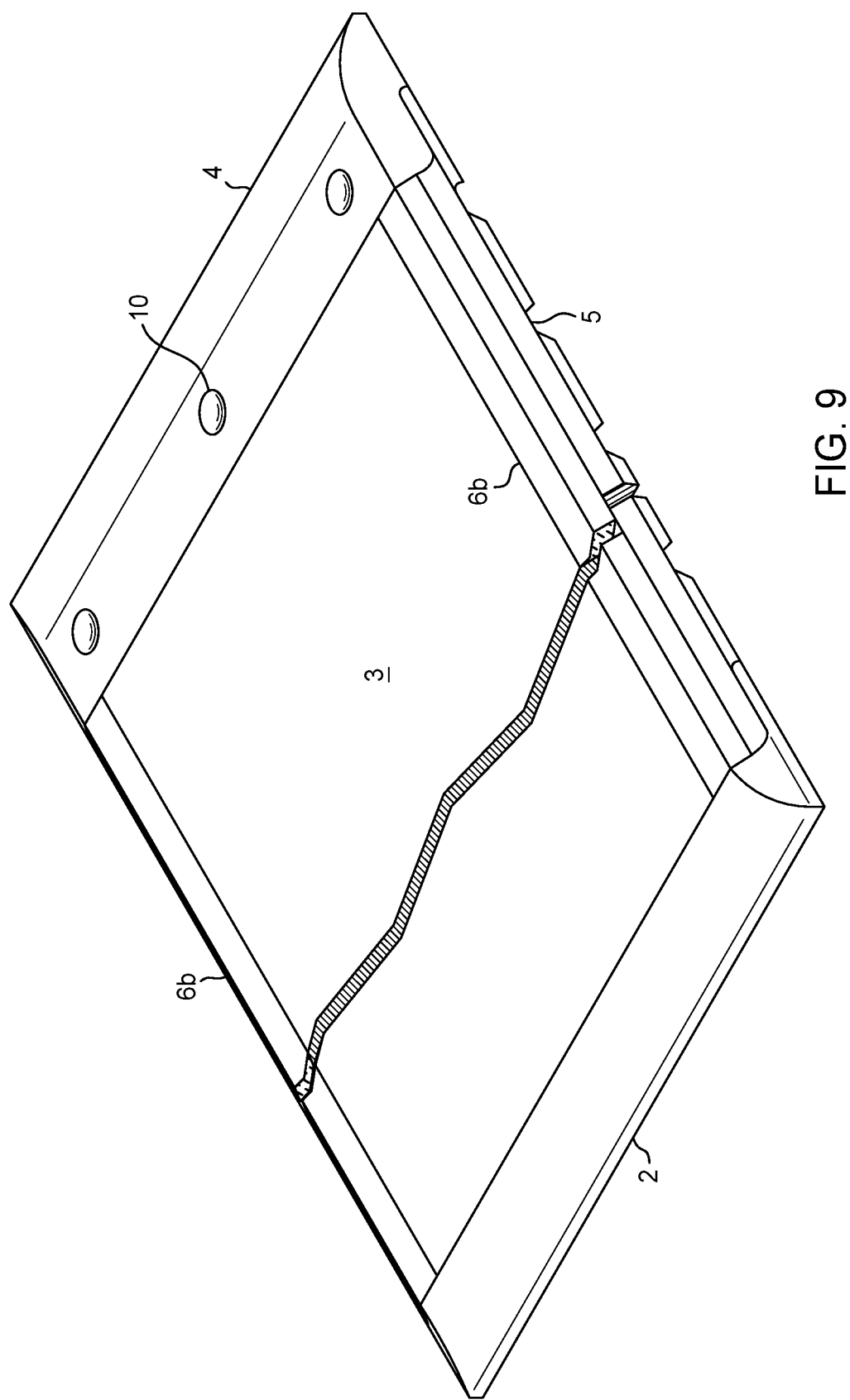
FIG. 9 shows a perspective view of the assembled modular mat system.

A perspective view of the assembled components of the sidewalk are shown in FIG. 9 with a break line to show extended length of the sidewalk.

The invention claimed is:

1. A modular mat assembly, comprising:
   a) interconnected mats that form a surface for attaching a sidewalk;
   b) removable anchors for securing the interconnected mats to the ground, and
   c) removable surface mats that connect to the interconnected mats and permit quick repair or replacement of the removable surface mats.

2. The modular mat assembly of claim 1, further comprising LEDs contained within the removable surface mats.

3. The modular mat assembly of claim 2, wherein the LEDs are rechargeable by exposure to sunlight transmitted through the removable surface mats.

4. The modular mat assembly of claim 3, wherein the LEDs are embedded in the removable surface mats along the edge of the walkway.

5. The modular mat assembly of claim 4, wherein the anchor elements are removable by drilling a recycled plastic.

6. A method of assembling a modular mat to form a walkway, comprising placing a commencing anchoring element on the ground, then positioning one or more bottom/foundation mats on the ground in sequence from the commencing anchoring element, and then snapping retainers in the bottom/foundation mats into receptacles in the commencing anchoring element.

7. The method of claim 6, further comprising positioning a terminating anchoring element over the final bottom/foundation mat, then snapping retainers in the terminating anchoring element into the receptacles in the final bottom/foundation mat.

8. The method of claim 7, further comprising snapping one or more top surface mats into receptacles in the bottom/foundation mats.

9. The method of claim 8, wherein one or more shoulder elements containing LED's are secured to the bottom/foundation mats at the edges of the walkway adjacent center top surface contact mats without LED's.

* * * * *